(12) United States Patent
Isono

(10) Patent No.: US 8,763,477 B2
(45) Date of Patent: Jul. 1, 2014

(54) OPERATION AMOUNT DETECTING APPARATUS

(75) Inventor: Hiroshi Isono, Mishima (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 423 days.

(21) Appl. No.: 13/121,098

(22) PCT Filed: Dec. 3, 2008

(86) PCT No.: PCT/JP2008/071929
§ 371 (c)(1),
(2), (4) Date: Mar. 25, 2011

(87) PCT Pub. No.: WO2010/064304
PCT Pub. Date: Jun. 10, 2010

(65) Prior Publication Data
US 2011/0179885 A1      Jul. 28, 2011

(51) Int. Cl.
*G01L 1/04*   (2006.01)
*G05G 1/30*   (2008.04)

(52) U.S. Cl.
USPC .................................. 73/862.636; 74/512

(58) Field of Classification Search
CPC .................................. B60T 11/18; G05G 1/38
USPC .................................................... 73/862.636
See application file for complete search history.

(56) References Cited

U.S. PATENT DOCUMENTS

2008/0223171 A1*  9/2008  Fujiwara et al. ............... 74/512

FOREIGN PATENT DOCUMENTS

| EP | 2 003 434 A2 | 12/2008 |
|---|---|---|
| JP | 3453507 B2 | 8/1999 |
| JP | 2000-103325 A | 4/2000 |
| JP | 2001-018768 A | 1/2001 |
| JP | 2001-039276 A | 2/2001 |
| JP | 2007-131230 A | 5/2007 |
| JP | 2008-262531 A | 10/2008 |

* cited by examiner

*Primary Examiner* — Lisa Caputo
*Assistant Examiner* — Brandi N Hopkins
(74) *Attorney, Agent, or Firm* — Sughrue Mion, PLLC

(57) ABSTRACT

In an operation amount detecting apparatus, a brake pedal is coupled with an operation rod by a coupling shaft, respective end portions of an elastic member are supported at support positions of a brake pedal by support shafts, the brake pedal is away in a direction orthogonal to an axis line direction of an operation rod with respect to the coupling shaft, an intermediate portion of the elastic member is relatively displaceably coupled by the coupling shaft and a coupling hole, and the elastic member is disposed with output strain sensors which detect an elastic deformation amount of the elastic member and output the elastic deformation amount as a brake operation amount.

20 Claims, 10 Drawing Sheets

OPERATION AMOUNT DETECTING APPARATUS

CROSS REFERENCE TO RELATED APPLICATIONS

This application is a National Stage of International Application No. PCT/JP2008/071929 filed Dec. 3, 2008, the contents of all of which are incorporated herein by reference in their entirety.

TECHNICAL FIELD

The present invention relates to an operation amount detecting apparatus that converts a rotational motion of an operation member such as a brake pedal to a linear motion of an operation rod and detects an operation amount to be transmitted to an operation target member.

BACKGROUND ART

As a brake device of a vehicle, there is known, for example, an electronically controlled Brake (ECB) as an electronically controlled brake which electrically controls a brake force applied by a brake device, that is, a brake hydraulic pressure supplied to a wheel cylinder which drives the brake device depending on an operation amount (a pedal stroke, a depression force, and the like) input from a brake pedal.

The ECB is configured to accumulate a hydraulic pressure which is increased by a pump in an accumulator, adjusts the hydraulic pressure in response to a brake requirement of a driver, and supplies the hydraulic pressure to wheel cylinders as a brake hydraulic pressure. That is, when the driver depresses a brake pedal, a master cylinder generates a hydraulic pressure depending on an operation amount of the brake pedal as well as a part of an operating oil flows into a stroke simulator, and the operation amount of the brake pedal is adjusted depending on a depression force of the brake pedal. In contrast, a brake ECU sets a target deceleration of a vehicle depending on a pedal stroke, determines brake forces applied to respective wheels, and applies predetermined hydraulic pressures from the accumulator to the respective wheel cylinders.

In the electronically controlled brake device, the operation amount (the pedal stroke, the depression force, and the like) input from the brake pedal must be detected with a high degree of accuracy. There are brake pedal operation amount detecting apparatuses described in the following Patent Documents 1 and 2 as conventional brake pedal operation amount detecting apparatuses.

An operation force relating signal output device described in Patent Document 1 is configured such that a turn member, which is rotated about an axis line orthogonal to an axis line of an input rod by a relative movement of a brake operation member and the input rod, is attached to the brake operation member, the brake operation member and the input rod are urged by an elastic member in a direction where they are away from each other in an axis direction of the input rod, and the signal output device, which is operated by the relative movement between the brake operation member and the input rod and outputs a signal relating to an operation force, is interposed between the brake operation member and the turn member. Further, a brake operation force detection device described in Patent Document 2 is disposed with a detector, which is relatively movably held by a device main body, and a load detector, which is mechanically cooperated with the detector and detects a load from the detector, and detects a brake operation force of a brake operation member operated by a driver, and the brake operation force detection device is provided with a nonlinear characteristic application unit which makes the ratio of an output of the load detector to a movement amount of the detector smaller in a state in which the movement amount of the detector is large than a state in which the movement amount of the detector is small.

Patent Document 1: Japanese Patent No. 3453507
Patent Document 2: Japanese Patent Application Laid-open No. 2001-018768

DISCLOSURE OF INVENTION

Problem to be Solved by the Invention

In the conventional operation amount detecting apparatuses of the brake pedal described above, a turn lever which transmits the operation force of the brake operation member to the detector is necessary, and further a mechanism, which takes out only a load necessary to detection by a load restriction mechanism and the like, is also necessary to the turn lever. Accordingly, since a structure such as the detection mechanism, the load restriction mechanism, becomes complicated, a manufacturing cost increases. Further, there is also a problem in that a maintenance property is deteriorated due to the complicated structure.

The present invention is to solve such a problem, and an object of the present invention is to provide an operation amount detecting apparatus which can reduce a manufacturing cost by simplifying a structure as well as can configure a load restriction function.

Means for Solving Problem

In order to solve the above mentioned problem and achieve the object, an operation amount detecting apparatus, according to the present invention, that converts a rotational motion of an operation member to a linear motion of an operation rod and detects an operation amount transmitted to an operation target member, includes a coupling shaft that couples the operation member with the operation rod; an elastic member one side of which is supported at a support position of the operation member which is away in a direction orthogonal to an axis line direction of the operation rod with respect to the coupling shaft and the other side of which is coupled with the coupling shaft; and a detection unit that detects an elastic deformation amount of the elastic member and outputs the elastic deformation amount as an operation amount.

In the operation amount detecting apparatus, according to the present invention, the elastic member is fixed with a movable member, and the movable member is coupled with the coupling shaft so as to be relatively movable with respect to the axis line direction of the operation rod.

In the operation amount detecting apparatus, according to the present invention, a relative moving amount of the movable member is regulated by a regulating portion.

In the operation amount detecting apparatus, according to the present invention, the operation member is coupled with the other side of the elastic member so as to be relatively displaceable along an axis direction of the coupling shaft.

In the operation amount detecting apparatus, according to the present invention, the operation member is coupled with one side of the elastic member so as to be relatively displaceable along an axis direction of a support shaft, and a relative moving amount of the operation member and the other side of the elastic member is set smaller than a relative displacement amount of the operation member and the other side of the elastic member.

In the operation amount detecting apparatus, according to the present invention, an intermediate portion of the elastic member in a longitudinal direction is coupled with the coupling shaft as the other side, and respective end portions of the elastic member in the longitudinal direction are coupled with the operation member as the one side by a support shaft via a support lever.

In the operation amount detecting apparatus, according to the present invention, the elastic member is supported by the support lever so that a reverse direction moment acts on the support shaft on one side and on the support shaft on the other side using a coupling position of the elastic member with the coupling shaft as a base point.

In the operation amount detecting apparatus, according to the present invention, a coupling position of the elastic member and the support lever and a coupling position of the support lever and the support shaft are offset in a direction orthogonal to the axis line direction of the operation rod.

In the operation amount detecting apparatus, according to the present invention, the support lever on one side and the movable member are integrally formed, and the coupling shaft is offset to the support shaft side of the support lever on the one side.

In the operation amount detecting apparatus, according to the present invention, a coupling position of the elastic member and the support lever on the other side and a coupling position of the support lever on the other side and the support shaft are offset in a direction orthogonal to the axis line direction of the operation rod.

In the operation amount detecting apparatus, according to the present invention, support levers of respective end portions of the elastic member in the longitudinal direction are integrally coupled with each other by a coupling member.

In the operation amount detecting apparatus, according to the present invention, the coupling member is disposed with a regulating portion that regulates a relative moving amount of the movable member.

In the operation amount detecting apparatus, according to the present invention, a position at which a load is input to the elastic member and a position at which a load is input from the elastic member to the movable member are offset in a direction orthogonal to the axis line direction of the operation rod.

In the operation amount detecting apparatus, according to the present invention, an urging member is disposed to urge the operation member and the elastic member in a direction where the operation member approaches the elastic member.

In the operation amount detecting apparatus, according to the present invention, an elastic deformation assisting member is disposed to assist an elastic deformation of the elastic member.

In the operation amount detecting apparatus, according to the present invention, a strain sensor as the detection unit is disposed between the coupling shaft and the support position in the elastic member.

Further, in an operation amount detecting apparatus, according to the present invention, that converts a rotational motion of an operation member to a linear motion of an operation rod and detects an operation amount transmitted to an operation target member, the operation member is coupled with the operation rod by a coupling shaft; one side of an elastic member is supported to the operation member by a support shaft, the operation member is away in a direction orthogonal to an axis line direction of the operation rod with respect to the coupling shaft; a movable member is fixed to the other side of the elastic member and coupled with the coupling shaft relatively movable with respect to the axis line direction of the operation rod; and the elastic member is attached with a detection unit that detects an elastic deformation amount and outputs the elastic deformation amount as an operation amount.

Effect of the Invention

According to the operation amount detecting apparatus of the present invention, since there are provided the coupling shaft which couples an operation member with the operation rod, the elastic member one side of which is supported at the support position of the operation member which is away in the direction orthogonal to the axis line direction of the operation rod with respect to the coupling shaft and the other side of which is coupled with the coupling shaft, and the detection unit which detects the elastic deformation amount of the elastic member and outputs the elastic deformation amount as the operation amount, a manufacturing cost can be reduced by simplifying a structure as well as a load restriction function can be configured.

Further, according to the operation amount detecting apparatus of the present invention, since the operation member is coupled with the operation rod by the coupling shaft, the one side of the elastic member is supported to the support shaft, which is away in the direction orthogonal to the axis line direction of the operation rod with respect to the coupling shaft, by a support shaft, the movable member is fixed to the other side of the elastic member and coupled with the coupling shaft so as to relatively move with respect to the axis line direction of the operation rod, and the elastic member is attached with the detection unit which detects the elastic deformation amount and outputs the elastic deformation amount as the operation amount, a manufacturing cost can be reduced by simplifying a structure and configuring the operation amount detecting apparatus as a module as well as a load restriction function can be configured.

BRIEF DESCRIPTION OF DRAWINGS

FIG. 2-1 is an A-A sectional view of FIG. 1 showing a structure of a support portion in the operation amount detecting apparatus of the first embodiment.

FIG. 2-2 is a B-B sectional view of FIG. 1 showing a structure of a coupling portion in the operation amount detecting apparatus of the first embodiment.

EXPLANATION OF LETTERS OR NUMERALS

Figure 1:
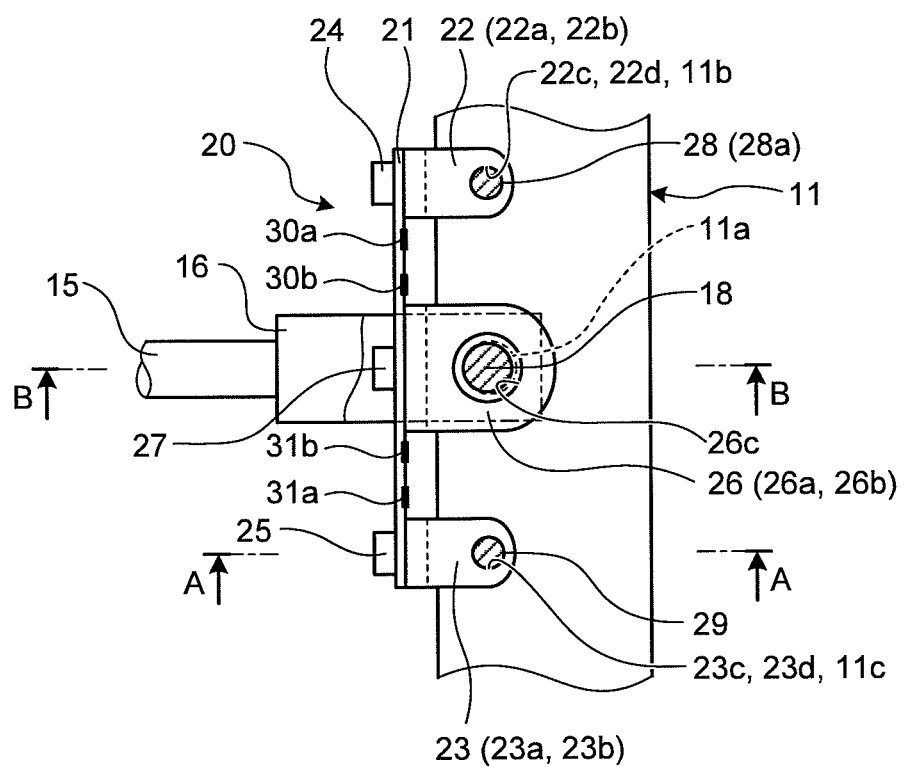
FIG. 1 is a main portion front view, partly in cross section showing an operation amount detecting apparatus according to a first embodiment of the present invention.

11 Brake pedal (operation member)
11a Couple hole (regulating portion)
13 Rotation shaft
15 Operation rod
16 Clevis
18 Coupling shaft
20 Operation amount detection unit
21 Elastic member
22, 23, 51, 52, 61, 65 Support lever
26, 76 Coupling lever (movable member)
26c, 26d Support hole
26e, 26f Bush
28, 29 Support shaft
30a, 30b, 31a, 31b, 43, 63a, 63b, 77a, 77b Strain sensor (detection unit)
41 Support coupling lever
71, 75 Support member (coupling member)
72 Restriction member (urge member)
72a Spring member (urge member)
81 Disc spring (elastic deformation assisting member)
92, 96 Stroke sensor (detection unit)

BEST MODE(S) FOR CARRYING OUT THE INVENTION

Embodiments of an operation amount detecting apparatus according to the present invention will be explained below in detail based on the drawings. Note that the present invention is not limited by the embodiments.

First Embodiment

Figures 1, 2:
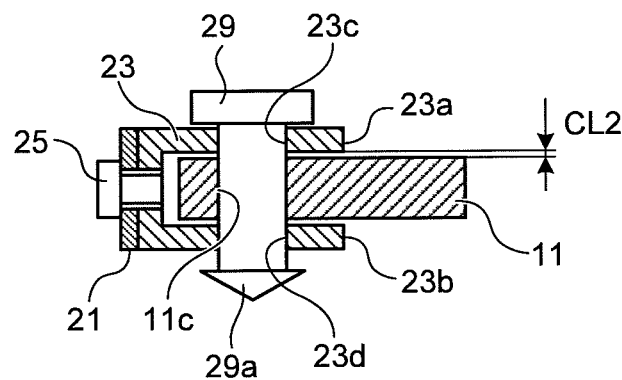
Figure 2:
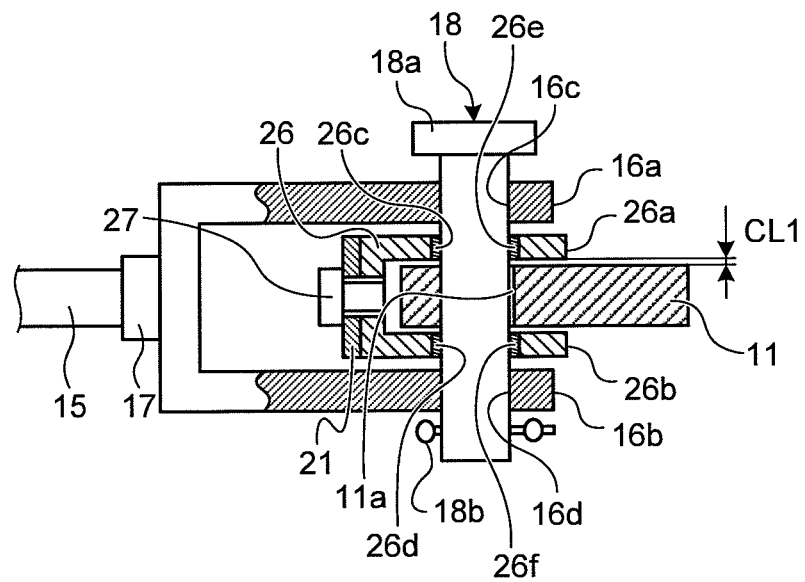
Figure 3:
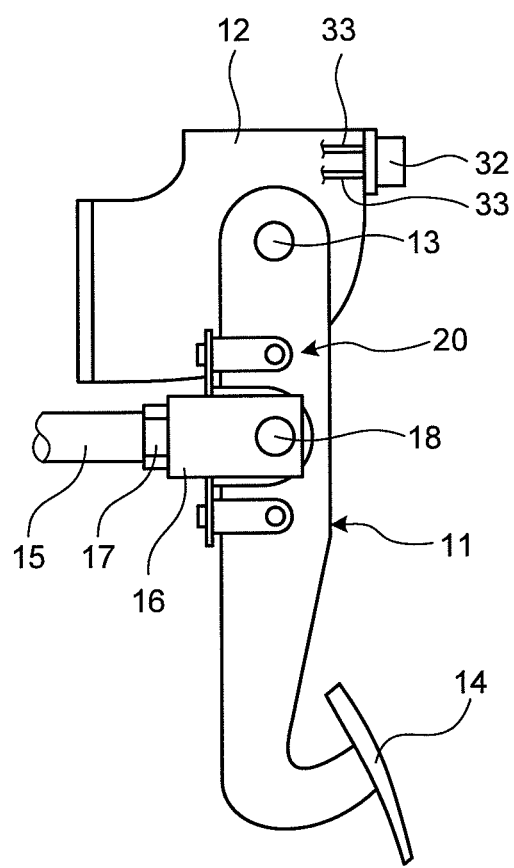
FIG. 3 is a front view showing an overall configuration of the operation amount detecting apparatus of the first embodiment.

FIG. 1 is a main portion front view, partly in cross section showing an operation amount detecting apparatus according to a first embodiment of the present invention, FIG. 2-1 is an A-A sectional view of FIG. 1 showing a structure of a support portion in the operation amount detecting apparatus of the first embodiment, FIG. 2-2 is a B-B sectional view of FIG. 1 showing a structure of a coupling portion in the operation amount detecting apparatus of the first embodiment, and FIG. 3 is a front view showing an overall configuration of the operation amount detecting apparatus of the first embodiment.

In the operation amount detecting apparatus of the first embodiment, as shown in FIG. 3, an upper end portion of a brake pedal 11 as an operation member is hung and supported rotatably to an attachment bracket 12, which is fixed to a not shown vehicle body, by a rotation shaft 13, and a pedal 14, which can be depressed by a crew is attached to a lower end portion of the brake pedal 11. In contrast, a tip end of an operation rod 15 is coupled with a master cylinder and a brake booster, which are not shown, as operation target members that operate and control a brake device (not shown).

Further, a base end portion of the operation rod 15 is threaded into a clevis 16 and prevented from being loosened by a lock nut 17. The clevis 16 has bifurcated portions 16a, 16b (refer to FIG. 2-2) which are positioned on both the sides of the brake pedal 11 in an intermediate portion of the brake pedal 11 at predetermined intervals, and the brake pedal 11 is rotatably coupled with a coupling shaft 18 by that the coupling shaft 18 passes through the brake pedal 11 and the bifurcated portions 16a, 16b.

Accordingly, when the crew depresses the brake pedal 11, the brake pedal 11 rotates via the rotation shaft 13, and an operation amount (operation force) of the brake pedal 11 is transmitted to the operation rod 15 via the coupling shaft 18 and the clevis 16 so that the operation rod 15 moves in an axis direction and can operate the brake booster and the master cylinder.

The operation amount detecting apparatus of the first embodiment converts the rotational motion of the brake pedal 11 to the linear motion of the operation rod 15 and detects a brake pedal stroke (or a brake pedal depression force) as the operation amount transmitted to the master cylinder and the brake booster. In the first embodiment, an operation amount detection unit 20 can be attached to the brake pedal 11 described above as a module.

The operation amount detection unit 20 will be explained in detail.

As shown in FIG. 1 to FIG. 3, in the operation amount detection unit 20, the bifurcated portions 16a, 16b of the clevis 16, with which the operation rod 15 is coupled, are disposed on both the sides in a plate thickness direction in the intermediate portion of the brake pedal 11 at the predetermined intervals and formed with coupling holes 16c, 16d, respectively, and further the brake pedal 11 is formed with a coupling hole 11a. The coupling shaft 18 having a head portion 18a passes through the respective coupling holes 16c, 16d and the coupling hole 11a from one side of the bifurcated portions 16a, 16b and is prevented from being removed therefrom by a clip 18b locked to a tip end of the coupling shaft 18.

An elastic member 21 is manufactured of a metal, a synthetic resin, and the like, has a predetermined thickness as well as has a predetermined length in a longitudinal direction of the brake pedal 11 and is configured so as to be elastically deformed by a predetermined load. The elastic member 21 is disposed on a front end side of the brake pedal 11 along a longitudinal direction of the brake pedal 11, an upper end portion (on one side) and a lower end portion (on one side) of the elastic member 21 are couples with support levers 22, 23 by attachment bolts 24, 25, and an intermediate portion (on the other side) of the elastic member 21 is coupled with a coupling lever (movable member) 26 by an attachment bolt 27.

The support levers 22, 23 have bifurcated portions 22a, 22b, 23a, 23b positioned on both the sides of the brake pedal 11 in the plate thickness direction at a predetermined interval. Since support shafts 28, 29 pass through support holes 11b, 11c of the brake pedal 11 and support holes 22c, 22d, 23c, 23d of the bifurcated portions 22a, 22b, 23a, 23b respectively and tip ends of the support shafts 28, 29 are applied with caulkings 28a, 29a, the brake pedal 11 is relatively rotatably coupled with the respective support levers 22, 23.

Further, the coupling lever 26 has bifurcated portions 26a, 26b which are positioned on both the sides of the brake pedal 11 in the plate thickness direction at the predetermined intervals. Since the coupling shaft 18 passes through the coupling hole 11a of the brake pedal 11 and bushes 26e, 26f attached to the support holes 26c, 26d of the bifurcated portions 26a, 26b, the brake pedal 11 is relatively rotatably coupled with the coupling lever 26.

In this case, the upper end portion and the lower end portion (on one sides) of the elastic member 21 are supported at support positions of the brake pedal 11 which is away in a direction orthogonal to an axis line direction of the operation rod 15 (a longitudinal direction of the brake pedal 11) with respect to the coupling shaft 18, and the other side (intermediate portion) of the elastic member 21 is coupled with the coupling shaft 18. Further, the other side (intermediate portion) of the elastic member 21 in a longitudinal direction is fixed with the coupling lever (movable member) 26, the coupling lever 26 is coupled with the coupling shaft 18, the support levers 22, 23 are fixed to respective end portions of the elastic member 21 in the longitudinal direction, and the support levers 22, 23 are coupled with the brake pedal 11 by the support shafts 28, 29. The coupling shaft 18 and the support shafts 28, 29 are positioned on a straight line orthogonal to the axis line direction of the operation rod 15.

Further, the coupling hole 11a of the brake pedal 11 is formed in a perfect circle, has an inner diameter set slightly larger than an outer diameter of the coupling shaft 18, and a predetermined gap is formed between the coupling hole 11a and the coupling shaft 18. Accordingly, the coupling lever 26 can relatively move along the axis line direction of the operation rod 15 by the predetermined gap with respect to the coupling hole 11a as well as, since the coupling hole 11a and the coupling shaft 18 act as a regulating portion of the present invention, a relative moving amount is regulated.

Further, on the coupling shaft 18, the brake pedal 11 is relatively displaceably coupled with the coupling lever 26 of the elastic member 21 along an axis direction of the coupling shaft 18 by a predetermined gap CL1. In contrast, on the support shafts 28, 29, the brake pedal 11 is relatively displaceably coupled with the support levers 22, 23 of the elastic member 21 along an axis direction of the support shafts 28, 29 by a predetermined gap CL2. The predetermined gap (relative moving amount) CL1 between the brake pedal 11 and the coupling lever 26 of the elastic member 21 is set smaller than the predetermined gap (relative moving amount) CL2 between the brake pedal 11 and the support levers 22, 23 of the elastic member 21.

The elastic member 21 is attached with four strain sensors (detection units) 30a, 30b, 31a, 31b on a surface thereof on the brake pedal 11 side between the coupling lever 26 and the support levers 22, 23. When the elastic member 21 is elastically deformed by a reaction force load from the operation rod 15, the strain sensors 30a, 30b, 31a, 31b detects an elastic deformation amount of the elastic member 21 and outputs the elastic deformation amount as an operation amount of the brake pedal 11. Note that a connector 32 is attached to an upper portion of the attachment bracket 12, and the respective strain sensors 30a, 30b, 31a, 31b are connected up to the connector 32 via wirings 33.

Accordingly, when the crew depresses the brake pedal 11, the brake pedal 11 is rotated via the rotation shaft 13, and the operation amount (operation force) of the brake pedal 11 is transmitted to the operation rod 15 via the coupling shaft 18 and the clevis 16. At the time, a reaction force of the brake booster and the master cylinder is input to the coupling lever 26 and the elastic member 21 from the operation rod 15 via the coupling shaft 18, and the elastic member 21 is elastically deformed so as to curve to the coupling shaft 18 side using the support shafts 28, 29 as fulcrums. In the respective strain sensors 30a, 30b, 31a, 31b, since the elastic member 21 is caused to strain in a tensile direction and in a compressive direction, the respective strain sensors 30a, 30b, 31a, 31b output a strain amount (elastic deformation amount) of the elastic member 21 as the operation amount of the brake pedal 11. That is, since the strain amount, the elastic deformation amount, and the operation amount of the brake pedal 11 are correlated with each other, the strain amount is converted to the operation amount of the brake pedal 11 using a preset map.

At the time, since the coupling lever 26 can move between the coupling hole 11a and the coupling shaft 18 by the predetermined gap, the elastic member 21 can be sufficiently elastically deformed, and further since the elastic deformation amount is regulated, a load restriction function is exhibited.

As described above, in the operation amount detecting apparatus of the first embodiment, the brake pedal 11 is coupled with the operation rod 15 by the coupling shaft 18, the respective end portions of the elastic member 21 are supported at the support positions of the brake pedal 11 which is away in the direction orthogonal to the axis line direction of the operation rod 15 with respect to the coupling shaft 18 by the support shafts 28, 29, the intermediate portion of the elastic member 21 is relatively displaceably coupled by the coupling shaft 18 and the coupling hole 11a, and the elastic member 21 is disposed with the strain sensors 30a, 30b, 31a, 31b which detect the elastic deformation amount of the elastic member 21 and output the elastic deformation amount as the brake operation amount.

Accordingly, when the operation reaction force of the brake pedal 11 is input to the elastic member 21 via the operation rod 15, the elastic member 21 is elastically deformed so as to curve using the support shafts 28, 29 as fulcrums, and the respective strain sensors 30a, 30b, 31a, 31b can detect the elastic deformation amount of the elastic member 21 as the strain amount load in the tensile direction and in the compressive direction and can output the strain amount load as the operation amount of the brake pedal 11. That is, a manufacturing cost can be reduced by simplifying a structure of the operation amount detection unit 20 as well as the load restriction function can be easily configured.

Further, in the operation amount detecting apparatus of the first embodiment, the elastic member 21 is fixed with the coupling lever 26 as the movable member, and the coupling lever 26 and the coupling hole 11a are coupled with each other so as to relatively move in the axis line direction of the operation rod 15. The relative moving amount of the coupling lever 26 is regulated by the coupling shaft 18 and the coupling hole 11a as the regulating portion. Accordingly, since the elastic member 21 is integrated with the coupling lever 26 as well as a relative displacement amount of the coupling lever 26 is regulated by the coupling shaft 18 and the coupling hole 11a, the apparatus can be made compact and a cost of the apparatus can be reduced.

Further, in the operation amount detecting apparatus of the first embodiment, the brake pedal 11 and the coupling lever 26 of the elastic member 21 are coupled with each other so as to be relatively displaceable along the axis direction of the coupling shaft 18, and the brake pedal 11 and the support levers 22, 23 of the elastic member 21 are coupled with one another so as to be relatively displaceable along the axis direction of the support shafts 28, 29. Accordingly, since the coupling lever 26 and the support levers 22, 23 are permitted to be relatively displaceable in an axis direction, a load acting on the elastic member 21 in the direction of the coupling shaft 18, reliability can be improved. Further, since the operation amount detecting apparatus can be modularized and assembled to the brake pedal 11 only by inserting the respective shafts 18, 28, 29, an assembly property of the operation amount detecting apparatus including the respective strain sensors 30a, 30b, 31a, 31b to the brake pedal 11 can be improved. The relative displacement amount between the brake pedal 11 and the coupling lever 26 is set smaller than a relative displacement between the brake pedal 11 and the support levers 22, 23. Since the support levers 22, 23 are away from the brake pedal 11 in the axis direction of the support shafts 28, 29 with respect to a lateral force of the brake pedal 11, a load of the elastic member 21 is reduced and reliability can be improved.

Further, in the operation amount detecting apparatus of the first embodiment, the intermediate portion of the elastic member 21 is coupled with the brake pedal 11 by the coupling shaft 18 via the coupling lever 26, and the respective end portions of the elastic member 21 are coupled with the brake pedal 11 by the support shafts 28, 29 via the support levers 22, 23. Accordingly, since the elastic member 21 can be supported with a sufficient strength as well as the relative displacement of the elastic member 21 can be appropriately permitted, a detection accuracy can be improved.

Further, in the operation amount detecting apparatus of the first embodiment, the brake pedal 11 is coupled with the operation rod 15 by the coupling shaft 18, the respective end portions of the elastic member 21 are fixed with the support levers 22, 23, the brake pedal 11, which is away in the direction orthogonal to the axis line direction of the operation rod 15, is supported by the support shafts 28, 29 with respect to the coupling shaft 18, the coupling lever 26 is fixed to the intermediate portion of the elastic member 21 and coupled with the brake pedal 11 by the coupling shaft 18 so as to be relatively movable with respect to the axis line direction of the operation rod 15, and the elastic member 21 is disposed with the strain sensors 30a, 30b, 31a, 31b which detect the elastic deformation amount and output the elastic deformation amount as the operation amount.

Accordingly, since the operation amount detecting apparatus can be modularized as the operation amount detection unit 20, the structure can be simplified and the manufacturing cost can be reduced.

Second Embodiment

Figure 4:
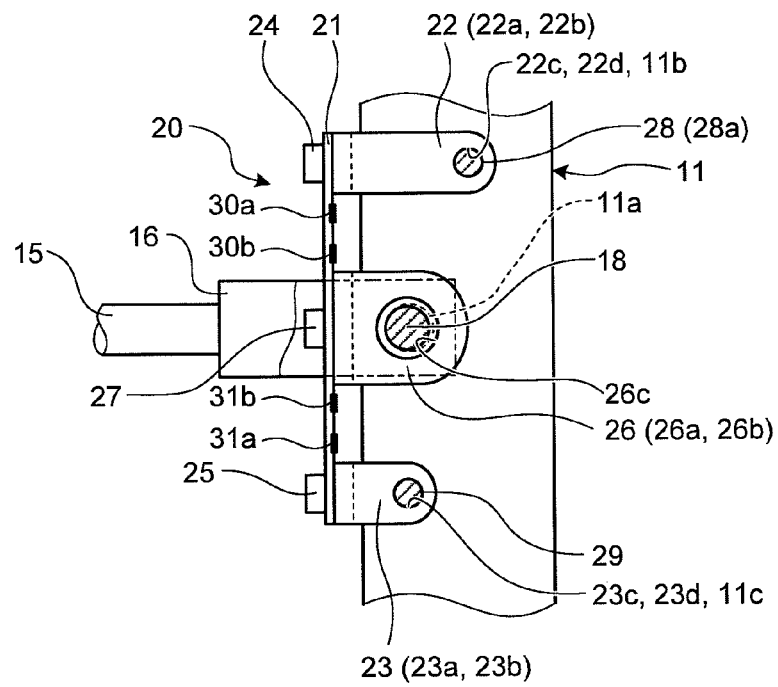
FIG. 4 is a main portion front view, partly in cross section showing an operation amount detecting apparatus according to a second embodiment of the present invention.

FIG. 4 is a main portion front view, partly in cross section showing an operation amount detecting apparatus according to a second embodiment of the present invention. Note that members having the same functions as those in the embodiment described above are denoted by the same reference numerals and a duplicate explanation is omitted.

In the operation amount detecting apparatus of the second embodiment, as shown in FIG. 4, an upper end portion and a lower end portion of an elastic member 21 are coupled with support levers 22, 23, and an intermediate portion of the elastic member 21 is coupled with a coupling lever 26. In the support levers 22, 23, bifurcated portions 22a, 22b, 23a, 23b are coupled with a brake pedal 11 by support shafts 28, 29. In this case, the upper end portion and the lower end portion of the elastic member 21 are supported at support positions of the brake pedal 11 which is away in a direction orthogonal to an axis line direction of an operation rod 15 with respect to a coupling shaft 18. Further, in the coupling lever 26, bifurcated portions 26a, 26b are coupled with the brake pedal 11 by the coupling shaft 18 so as to be relatively movable along an axis line direction of the operation rod 15 as well as relative moving amounts of the bifurcated portions 26a, 26b are regulated. Although the coupling shaft 18 and the support shaft 29 on one side are positioned on a straight line orthogonal to the axis line direction of the operation rod 15, the support shaft 28 on the other side is offset in the axis line direction of the operation rod 15 with respect to the coupling shaft 18 and the support shaft 29 on the one side.

The elastic member 21 is attached with four strain sensors (detection units) 30a, 30b, 31a, 31b between the coupling lever 26 and the support levers 22, 23. When the elastic member 21 is elastically deformed by a reaction force load from the operation rod 15, the strain sensors 30a, 30b, 31a, 31b detect an elastic deformation amount of the elastic member 21 and outputs the elastic deformation amount as an operation amount of the brake pedal 11.

Note that, since an operation of the operation amount detecting apparatus of the second embodiment is the same as the first embodiment described above, an explanation of the operation is omitted.

As described above, in the operation amount detecting apparatus of the second embodiment, the support shaft 28 on the other side is offset in the axis line direction of the operation rod 15 with respect to the coupling shaft 18 and the support shaft 29 on the one side. Accordingly, when the operation amount detection unit is mounted on a vehicle, since the position of the respective support shafts 28, 29 can be set at appropriate positions depending on a layout, a degree of freedom of design can be improved.

Third Embodiment

Figure 5:
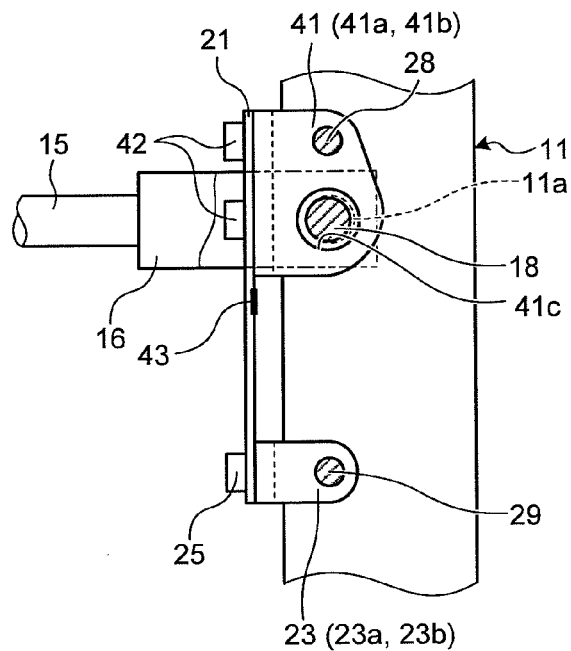
FIG. 5 is a main portion front view, partly in cross section showing an operation amount detecting apparatus according to a third embodiment of the present invention.

FIG. 5 is a main portion front view, partly in cross section showing an operation amount detecting apparatus according to a third embodiment of the present invention. Note that members having the same functions as those in the embodiment described above are denoted by the same reference numerals and a duplicate explanation is omitted.

In the operation amount detecting apparatus of the third embodiment, as shown in FIG. 5, a lower end portion (one side) of an elastic member 21 is coupled with a support lever 23 by an attachment bolt 25, and an upper end portion (the other side) of the elastic member 21 is coupled with a support coupling lever 41 by attachment bolts 42. The support coupling lever 41 includes bifurcated portions 41a, 41b which are positioned on both the sides of a brake pedal 11 in a plate thickness direction at a predetermined interval. The brake pedal 11 is coupled with the support coupling lever 41 by that a support shaft 28 passes through the brake pedal 11 and the bifurcated portions 41a, 41b. Further, the brake pedal 11 is coupled with the support coupling lever 41 by that a coupling shaft 18 passes through the brake pedal 11 and the bifurcated portions 41a, 41b. In contrast, the brake pedal 11 is coupled with the support lever 23 by that a support shaft 29 passes through the brake pedal 11 and the bifurcated portions 41a, 41b. Note that when the support shaft 29 passes through support holes 23c, 23d of the support lever 23, a support hole 11c of the brake pedal 11 acts as a long hole via which the support shaft 29 can be relatively displaced in a longitudinal direction (a direction orthogonal to an axis line direction of the operation rod 15) of an elastic member 21.

In this case, the support coupling lever 41 is configured by integrally forming the support lever 22 on the one side and the coupling lever 26 in the first embodiment (refer to FIG. 1), and the coupling shaft 18 is offset to the support shaft 28 side on the one side. Accordingly, the elastic member 21 is elastically deformed so as to be swung together with the coupling shaft 18 by the support coupling lever 41 using the support shaft 28 as a fulcrum.

Further, an inner diameter of a coupling hole 11a of the brake pedal 11 is set slightly larger than an outer diameter of the coupling shaft 18, and a predetermined gap is formed between the coupling hole 11a and the coupling shaft 18. Accordingly, the support coupling lever 41 can relatively move with respect to the coupling hole 11a by the predetermined gap along the axis line direction of the operation rod 15 as well as since the coupling hole 11a acts as a regulating portion of the present invention, a relative moving amount is regulated.

The elastic member 21 is attached with a strain sensor (detection unit) 43 attached between the support coupling lever 41 and the support lever 23. When the elastic member 21 is elastically deformed by a reaction force load from the operation rod 15, the strain sensor 43 detects an elastic deformation amount of the elastic member 21 and outputs the elastic deformation amount as an operation amount of the brake pedal 11.

Accordingly, when a crew depresses the brake pedal 11, a reaction force of a brake booster and a master cylinder is input from the operation rod 15 to the coupling lever 26 and the elastic member 21 via the coupling shaft 18, and the elastic member 21 is swung together with the coupling shaft 18 using the support shaft 28 as a fulcrum and elastically deformed so that the support shaft 29 side is curved. Since the elastic member 21 is strained in a tensile direction, the strain sensor 43 outputs a strain amount (elastic deformation amount) of the elastic member 21 as the operation amount of the brake pedal 11.

As described above, the operation amount detecting apparatus of the third embodiment is disposed with the support coupling lever 41 composed of the support lever integrally formed with the coupling lever and disposes the coupling shaft 18 by offsetting it to the support shaft 28 side on the one side. Accordingly, since the elastic member 21 is elastically deformed by the support coupling lever 41 so as to be swung together with the coupling shaft 18 using the support shaft 28 as a fulcrum, a detection accuracy can be improved by increasing an SN ratio (Signal to Noise Ratio) by increasing a relative displacement amount of the elastic member 21.

Fourth Embodiment

Figure 6:
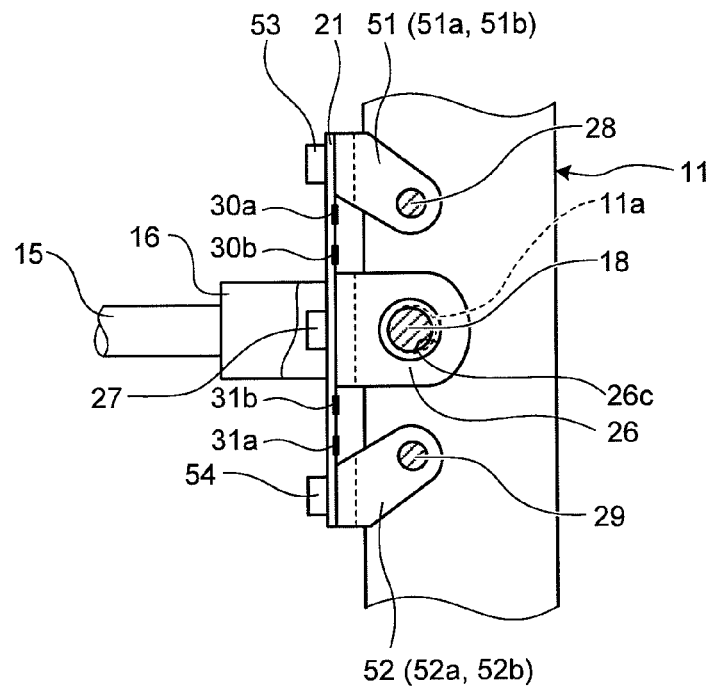
FIG. 6 is a main portion front view, partly in cross section showing an operation amount detecting apparatus according to a fourth embodiment of the present invention.

FIG. 6 is a main portion front view, partly in cross section showing an operation amount detecting apparatus according to a fourth embodiment of the present invention. Note that members having the same functions as those in the embodiment described above are denoted by the same reference numerals and a duplicate explanation is omitted.

In the operation amount detecting apparatus of the fourth embodiment, as shown in FIG. 6, an upper end portion (on one side) and a lower end portion (on one side) of an elastic member 21 are coupled with support levers 51, 52 by attachment bolts 53, 54, and an intermediate portion (on the other side) of the elastic member 21 is coupled with a coupling lever 26 by an attachment bolt 27. In the support levers 51, 52, bifurcated portions 51a, 51b, 52a, 52b are coupled with a brake pedal 11 by support shafts 28, 29. Further, in the coupling lever 26, bifurcated portions 26a, 26b are coupled with the brake pedal 11 by a coupling hole 11a so as to be relatively movable along an axis line direction of an operation rod 15 as well as relative moving amounts of the bifurcated portions 26a, 26b are regulated.

The elastic member 21 is supported by the support levers 51, 52 so that a reverse direction moment acts on the elastic member 21 of the support shaft 28 on one side and the support shaft 29 on the other side, respectively using a coupling position of the elastic member 21 and a coupling shaft 18 as a base point. That is, coupling positions of the support levers 51, 52 and the support shafts 28, 29 are offset in a direction orthogonal to an axis line direction of the operation rod 15, that is, on the coupling shaft 18 side with respect to coupling positions of the elastic member 21 and the support levers 51, 52.

The elastic member 21 is attached with four strain sensors 30a, 30b, 31a, 31b between the coupling lever 26 and the support levers 51, 52. When the elastic member 21 is elastically deformed by a reaction force load from the operation rod 15, the strain sensors 30a, 30b, 31a, 31b detect an elastic deformation amount of the elastic member 21 and outputs the elastic deformation amount as an operation amount of the brake pedal 11.

Accordingly, when a crew depresses the brake pedal 11, a reaction force of a brake booster and a master cylinder is input from the operation rod 15 to the coupling lever 26 and the elastic member 21 via the coupling shaft 18 so that the elastic member 21 is elastically deformed so as to be curved in an S-shape on a side. That is, the elastic member 21 is curved in the S-shape using the coupling shaft 18 as a fulcrum so that the support shaft 28 side and the support shaft 29 side become line symmetry. In the strain sensors 30b, 31b, the elastic member 21 is strained in a tensile direction, in the strain sensors 30a, 31a, the elastic member 21 is strained in a compressive direction, and the strain sensors 30b, 31b, 30a, 31a output the respective strain amounts as the operation amount of the brake pedal 11.

As described above, in the operation amount detecting apparatus of the fourth embodiment, the coupling positions of the support levers 51, 52 and the support shafts 28, 29 are offset in the direction orthogonal to the axis line direction of the operation rod 15, that is, on the coupling shaft 18 side with respect to the coupling positions of the elastic member 21 and the support levers 51, 52. Accordingly, when an operation reaction force acts on the elastic member 21, since the elastic member 21 is elastically deformed using the coupling position of the elastic member 21 and the coupling shaft 18 as a fulcrum so that the reverse direction moment acts on the support shaft 28 on the one side and on the support shaft 29 on the other side, respectively, the strain sensors 30a, 30b, 31a, 31b can detect a tensile strain amount and a compressive strain amount of the elastic member 21. As a result, a detection accuracy can be improved by removing a detection error due to a thermal expansion of the elastic member 21.

Fifth Embodiment

Figure 7:
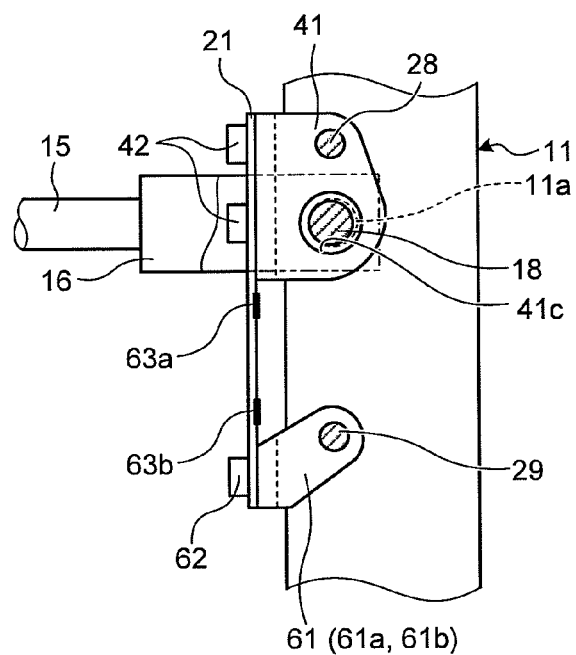
FIG. 7 is a main portion front view, partly in cross section showing an operation amount detecting apparatus according to a fifth embodiment of the present invention.

FIG. 7 is a main portion front view, partly in cross section showing an operation amount detecting apparatus according to a fifth embodiment of the present invention. Note that members having the same functions as those in the embodiment described above are denoted by the same reference numerals and a duplicate explanation is omitted.

In the operation amount detecting apparatus of the fifth embodiment, as shown in FIG. 7, a lower end portion (on one side) of an elastic member 21 is coupled with a support lever 61 by an attachment bolt 62, and an upper end portion (on the other side) of the elastic member 21 is coupled with a support coupling lever 41 by an attachment bolt 42. In the support coupling lever 41, bifurcated portions 41a, 41b are positioned on both the sides of a brake pedal 11 in a plate thickness direction at a predetermined interval. The brake pedal 11 is coupled with the support coupling lever 41 by that a support shaft 28 passes through the brake pedal 11 and the bifurcated portions 41a, 41b. The brake pedal 11 is coupled with the support coupling lever 41 by that the coupling shaft 18 passes through the brake pedal 11 and the bifurcated portions 41a, 41b. Further, in the support lever 61, bifurcated portions 61a, 61b are coupled with the brake pedal 11 by a support shaft 29.

The elastic member 21 is supported by the support coupling lever 41 and the support lever 61 so that a reverse direction moment acts on the support shaft 29 on the other side using a coupling position of the elastic member 21 with a coupling shaft 18 as a base portion. That is, a coupling position of the support lever 61 and the support shaft 29 is offset in a direction orthogonal to an axis line direction of an operation rod 15, that is, on the coupling shaft 18 side with respect to a coupling position of the elastic member 21 and the support lever 61.

The elastic member 21 is attached with two strain sensors 63a, 63b between the support coupling lever 41 and the support lever 61. When the elastic member 21 is elastically deformed by a reaction force load from the operation rod 15, the strain sensors 63a, 63b detect an elastic deformation amount of the elastic member 21 and outputs the elastic deformation amount as an operation amount of the brake pedal 11.

Accordingly, when a crew depresses the brake pedal 11, a reaction force of a brake booster and a master cylinder is input from the operation rod 15 to the coupling lever 26 and the elastic member 21 via the coupling shaft 18 and the elastic member 21 is elastically deformed so as to be curved in an S-shape. That is, the elastic member 21 is curved so as to approach the coupling shaft 18 on the support coupling lever 41 side and so as to be away from the support shaft 29 on the support lever 61 side. Thus, a load in a compressive direction acts on the strain sensor 63a from the elastic member 21, a load in a tensile direction acts on the strain sensor 63b from the elastic member 21, and a strain amount at the time is output as the operation amount of the brake pedal 11.

As described above, in the operation amount detecting apparatus of the fifth embodiment, a coupling position of the support lever 61 and the support shaft 29 is disposed by being offset in a direction orthogonal to an axis line direction of the operation rod 15, that is, on the coupling shaft 18 side with respect to a coupling position of the elastic member 21 and the support lever 61. Accordingly, when an operation reaction force acts on the elastic member 21, since the elastic member 21 is elastically deformed so that a reverse direction moment acts on the coupling shaft 18 side and on the other support shaft 29 side in the elastic member 21, the strain sensors 63a, 63b can detect a strain amount in the tensile direction and a strain amount in the compressive direction of the elastic member 21. As a result, a detection accuracy can be improved by removing a detection error due to a thermal expansion of the elastic member 21.

Sixth Embodiment

Figure 8:
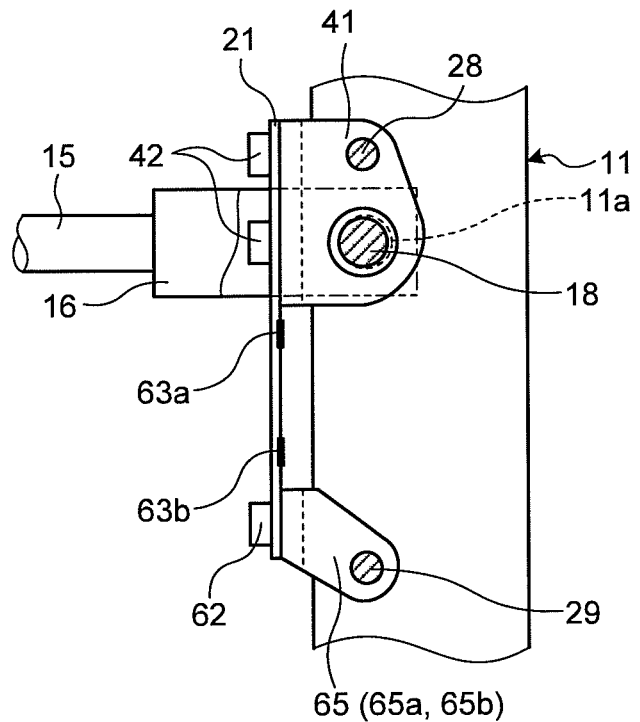
FIG. 8 is a main portion front view, partly in cross section showing an operation amount detecting apparatus according to a sixth embodiment of the present invention.

FIG. 8 is a main portion front view, partly in cross section showing an operation amount detecting apparatus according to a sixth embodiment of the present invention. Note that members having the same functions as those in the embodiment described above are denoted by the same reference numerals and a duplicate explanation is omitted.

In the operation amount detecting apparatus of the sixth embodiment, as shown in FIG. 8, a lower end portion (on one side) of an elastic member 21 is coupled with a support lever 65 by an attachment bolt 62, and an upper end portion (on the other side) of the elastic member 21 is coupled with a support coupling lever 41 by an attachment bolt 42. In the support lever 65, bifurcated portions 65a, 65b are coupled with a brake pedal 11 by a support shaft 29. A coupling position of the support lever 65 and the support shaft 29 is offset in a direction orthogonal to an axis line direction of an operation rod 15, that is, in a direction away from a coupling shaft 18 with respect to a coupling position of the elastic member 21 and the support lever 65.

The elastic member 21 is attached with two strain sensors 63a, 63b between the support coupling lever 41 and the support lever 65.

Accordingly, when a crew depresses the brake pedal 11, a reaction force of a brake booster and a master cylinder is input to a coupling lever 26 and the elastic member 21 from the operation rod 15 via the coupling shaft 18 and the elastic member 21 is swung together with the coupling shaft 18 using the support shaft 28 as a fulcrum and elastically deformed so that the support shaft 29 side of the elastic member 21 is curved. Since a tensile load acts on the strain sensors 63a, 63b from the elastic member 21, the respective strain sensors 63a, 63b output the tensile load (elastic deformation amount) as an operation amount of the brake pedal 11.

As described above, in the operation amount detecting apparatus of the sixth embodiment, the coupling position of the support lever 65 and the support shaft 29 is offset in the direction orthogonal to an axis line direction of the operation rod 15, that is, in the direction away from the coupling shaft 18 with respect to the coupling position of the elastic member 21 and the support lever 65. Accordingly, the elastic member 21 is elastically deformed by the support coupling lever 41 and the support lever 65 so as to be swung together with the coupling shaft 18 using the support shaft 28 as the fulcrum so that a detection accuracy can be improved by increasing an SN ratio by increasing a relative displacement amount of the elastic member 21.

Seventh Embodiment

Figure 9:
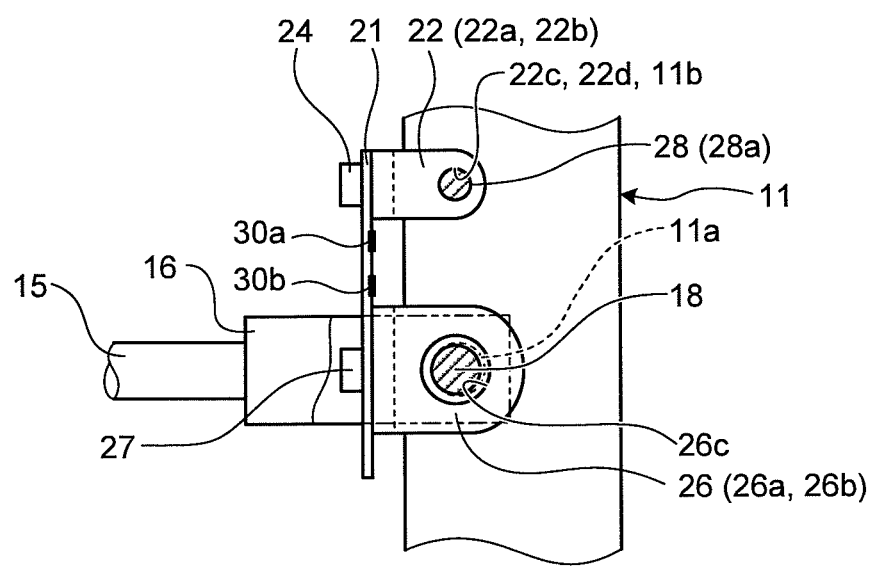
FIG. 9 is a main portion front view, partly in cross section showing an operation amount detecting apparatus according to a seventh embodiment of the present invention.

FIG. 9 is a main portion front view, partly in cross section showing an operation amount detecting apparatus according to a seventh embodiment of the present invention. Note that members having the same functions as those in the embodiment described above are denoted by the same reference numerals and a duplicate explanation is omitted.

In the operation amount detecting apparatus of the seventh embodiment, as shown in FIG. 9, an upper end portion of an elastic member 21 is coupled with a support lever 22, and the other side of the elastic member 21 is coupled with a coupling lever 26. In the support lever 22, bifurcated portions 22a, 22b are not rotatably coupled with a brake pedal 11 by a support shaft 28. Further, in the coupling lever 26, bifurcated portions 26a, 26b are coupled with the brake pedal 11 by a coupling shaft 18 so as to be relatively movable along an axis line direction of an operation rod 15 as well as relative moving amounts of the bifurcated portions 26a, 26b are regulated. That is, the elastic member 21 is cantilevered by the support shaft 28 via the support lever 22.

The elastic member 21 is attached with two strain sensors 30a, 30b between the coupling lever 26 and the support lever 22.

Note that, since an operation of the operation amount detecting apparatus of the seventh embodiment is the same as the first embodiment described above, an explanation of the operation is omitted.

As described above, in the operation amount detecting apparatus of the seventh embodiment, the elastic member 21 is cantilevered by the support shaft 28 via the support lever 22, and the cantilevered elastic member 21 is fixed with the coupling lever 26. Accordingly, a structure can be simplified.

Eighth Embodiment

Figure 10:
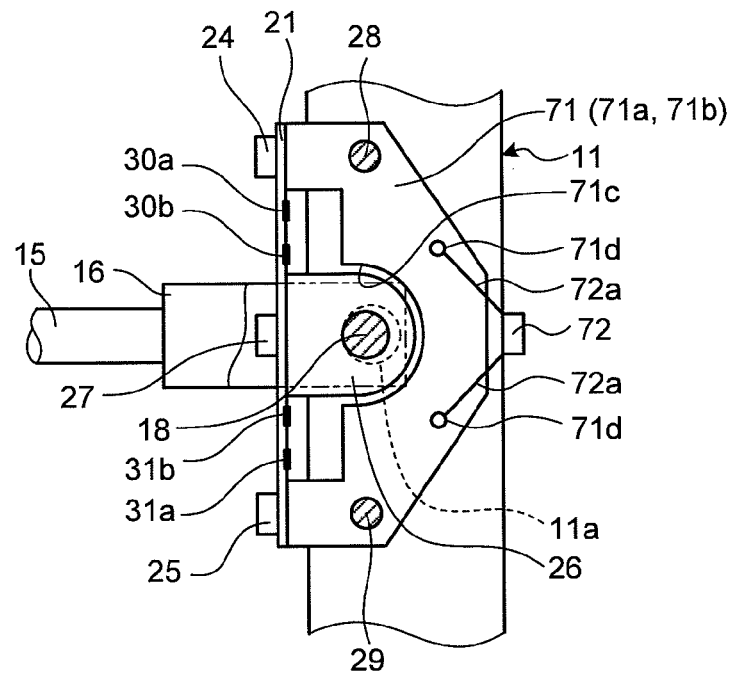
FIG. 10 is a main portion front view, partly in cross section showing an operation amount detecting apparatus according to an eighth embodiment of the present invention.
Figure 11:
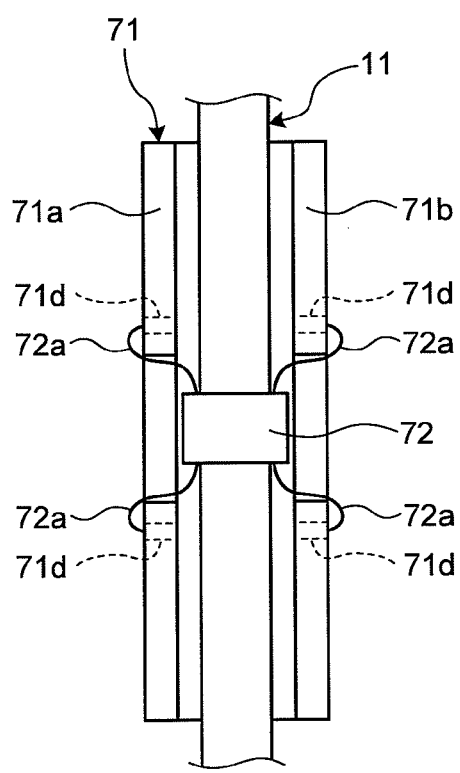
FIG. 11 is a main portion side view showing the operation amount detecting apparatus of the eighth embodiment.

FIG. 10 is a main portion front view, partly in cross section showing an operation amount detecting apparatus according to an eighth embodiment of the present invention, and FIG. 11 is a main portion side view showing the operation amount detecting apparatus of the eighth embodiment. Note that members having the same functions as those in the embodiment described above are denoted by the same reference numerals and a duplicate explanation is omitted.

In the operation amount detecting apparatus of the eighth embodiment, as shown in FIG. 10 and FIG. 11, a support member 71 is formed in a C-shape in a plan view and has bifurcated portions 71a, 71b. An upper end portion and a lower end portion of an elastic member 21 are coupled with one side and the other side of the support member 71 by attachment bolts 24, 25, and an the intermediate portion of the elastic member 21 is coupled with an coupling lever 26. In the support member 71, bifurcated portions 71a, 71b are positioned on both the sides of a brake pedal 11 and coupled with the brake pedal 11 by support shafts 28, 29.

That is, in the embodiment, support levers, which are attached to respective end portions of the elastic member 21 in a longitudinal direction are integrally coupled with each other by a coupling member, and the support member 71 is composed of the support levers integrally configured with the coupling member.

Further, the support member 71 is formed with an arc-shaped cutout portion 71c as a regulating portion which regulates a relative moving amount of the coupling lever 26. Accordingly, the coupling lever 26 can relatively move along an axis line direction of an operation rod 15 as well as a relative moving amount of the coupling lever 26 is regulated by that a tip end portion of the coupling lever 26 is abutted against the cutout portion 71c.

The elastic member 21 is attached with four strain sensors 30a, 30b, 31a, 31b between the coupling lever 26 and the support member 71.

Further, a restriction member 72 is dispose to an end face of the brake pedal 11, and four spring members 72a whose one sides are fixed to the restriction member 72 have the other sides locked to attachment holes 71d, 71e formed to the support member 71. The four spring members 72a function as urging members which urge the brake pedal 11 and the elastic member 21 in a direction where they approach each other. That is, the four spring members 72a are disposed along a longitudinal direction of the brake pedal 11 in a free state and elastically deformed and locked to the attachment holes 71d, 71e of the support member 71.

Accordingly, looseness of the brake pedal 11, the coupling shaft 18, the elastic member 21, the coupling lever 26, the support member 71, the support shafts 28, 29, and the like can be absorbed by urging forces of the four spring members 72a without influencing output characteristics of the strain sensors 30a, 30b, 31a, 31b. Further, the brake pedal 11, the elastic member 21, the coupling lever 26, the support member 71, and the like can be centered in an axis direction by the urging forces of the four spring members 72a.

Note that, since an operation of the operation amount detecting apparatus of the eighth embodiment is the same as the first embodiment described above, an explanation of the operation is omitted.

As described above, in the operation amount detecting apparatus of the eighth embodiment, the respective end portions of the elastic member 21 in the longitudinal direction are coupled with each other by the single support member 71 as well as the support member 71 is supported to the brake pedal 11 by the support shafts 28, 29, and the coupling lever 26 is coupled with the intermediate portion of the elastic member 21 and relatively displaceably coupled with the brake pedal 11 by the coupling shaft 18. Accordingly, since the elastic member 21 is suppressed from being swung in the support shafts 28, 29 by the support member 71, a detection accuracy can be improved. In this case, since the cutout portion 71c is formed to the support member 71 as the regulating portion which regulates the relative moving amount of the coupling lever 26, a structure can be simplified.

Further, in the operation amount detecting apparatus of the eighth embodiment, the restriction member 72 is disposed to the end face of the brake pedal 11, and the four spring members 72a extending from the restriction member 72 are locked to the attachment holes 71d, 71e of the support member 71. Accordingly, looseness of the device can be absorbed by the urging forces of the four spring members 72a as well as the respective members can be centered.

Ninth Embodiment

Figure 12:
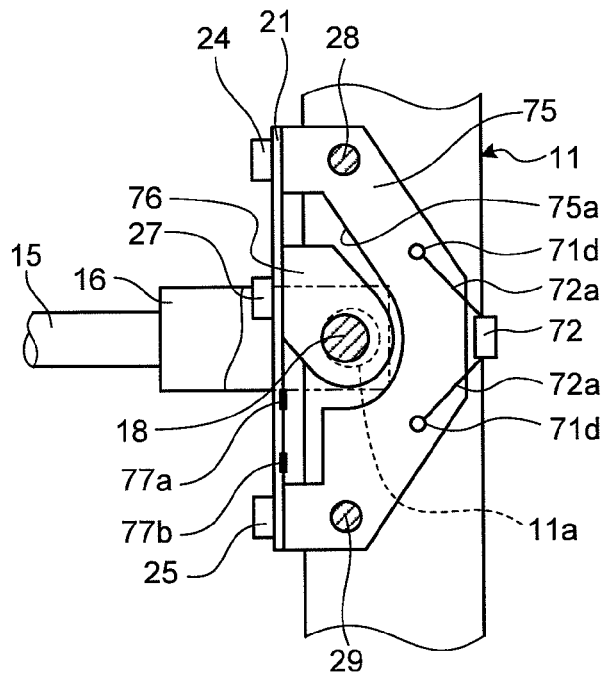
FIG. 12 is a main portion front view, partly in cross section showing an operation amount detecting apparatus according to a ninth embodiment of the present invention.

FIG. 12 is a main portion front view, partly in cross section showing an operation amount detecting apparatus according to a ninth embodiment of the present invention. Note that members having the same functions as those in the embodiment described above are denoted by the same reference numerals and a duplicate explanation is omitted.

In the operation amount detecting apparatus of the ninth embodiment, as shown in FIG. 12, a support member 75 is formed in a C-shape in a plan view, an upper end portion and a lower end portion of the elastic member 21 are coupled with one side and the other side of the support member 75 by attachment bolts 24, 25, and an intermediate portion of the elastic member 21 is coupled with a coupling lever 76. An upper end portion and a lower end portion of the support member 75 are coupled with a brake pedal 11 by support shafts 28, 29.

Further, the in the embodiment, a position, at which a load is input from an operation rod 15 to the elastic member 21, and a position, at which a load is input from the elastic member 21 to the coupling lever 76, are offset in a direction (longitudinal direction of the brake pedal 11) orthogonal to an axis line direction of the operation rod 15. The support member 75 is formed with an arc-shaped cutout portion 75a as a regulating portion which regulates a relative moving amount of the coupling lever 76. Accordingly, the coupling lever 76 can relatively move along the axis line direction of the operation rod 15 as well as a relative moving amount of the coupling lever 76 is regulated by that a tip end portion of the coupling lever 76 is abutted against the cutout portion 75a.

The elastic member 21 is attached with two strain sensors 77a, 77b between the coupling lever 76 and a lower end portion (attachment bolt 25) of the support member 75.

Note that, since an operation of the operation amount detecting apparatus of the ninth embodiment is the same as the first embodiment described above, an explanation of the operation is omitted.

As described above, in the operation amount detecting apparatus of the ninth embodiment, respective end portions of the elastic member 21 in a longitudinal direction are coupled with each other by the single support member 75 as well as the support member 75 is supported to the brake pedal 11 by the support shafts 28, 29, the coupling lever 76 is coupled with the intermediate portion of the elastic member 21 so as to be relatively displaced with the brake pedal 11 by a coupling shaft 18, and the position, at which the load is input from the operation rod 15 to the elastic member 21, and the position, at which the load is input from the elastic member 21 to the coupling lever 76, are offset in the direction orthogonal to the axis line direction of the operation rod 15. Accordingly, when an operation reaction force acts on the elastic member 21, since the elastic member 21 is liable to be elastically deformed, a detection accuracy can be improved by increasing an SN ratio by increasing a relative displacement amount of the elastic member 21.

Tenth Embodiment

Figure 13:
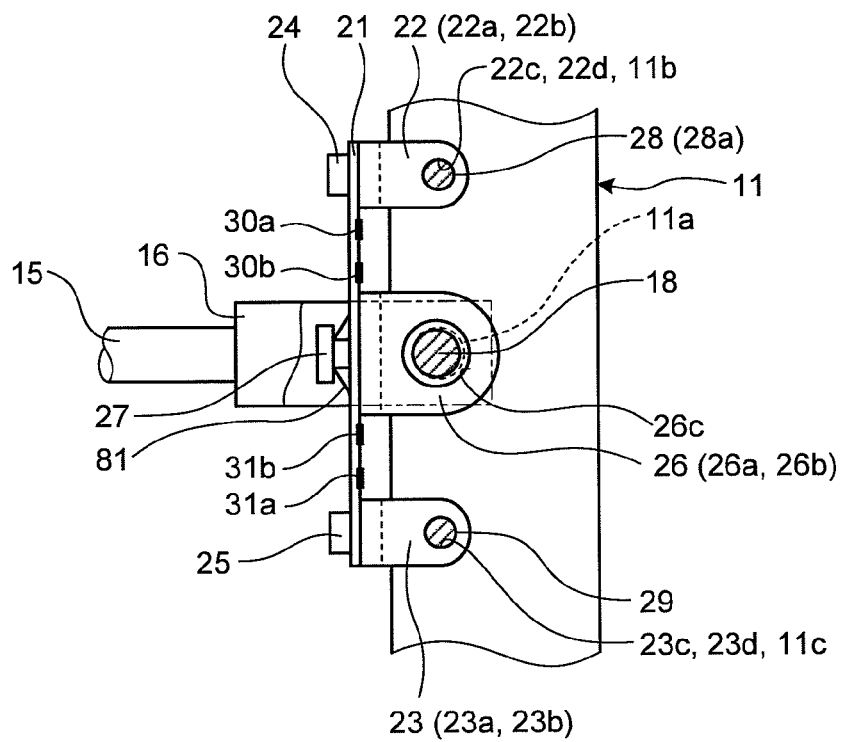
FIG. 13 is a main portion front view, partly in cross section showing an operation amount detecting apparatus according to a tenth embodiment of the present invention.
Figure 14:
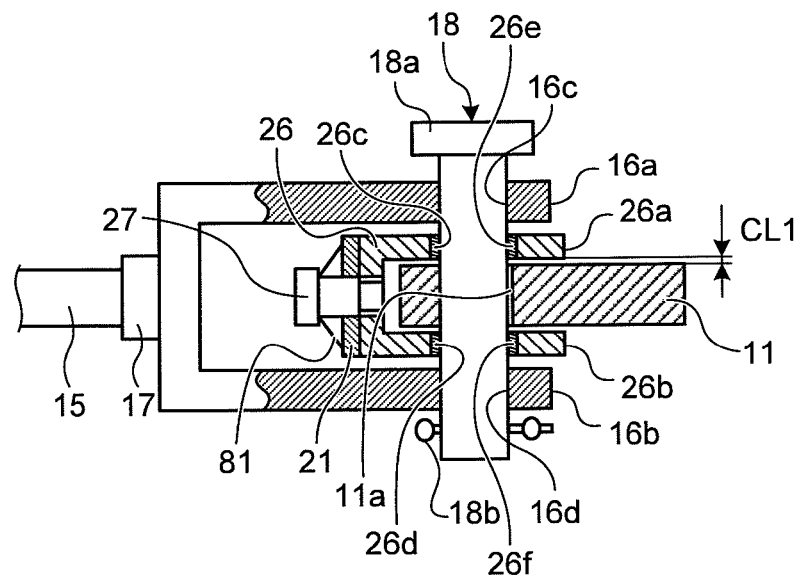
FIG. 14 is a C-C sectional view of FIG. 13 showing a structure of a coupling portion in the operation amount detecting apparatus of the tenth embodiment.

FIG. 13 is a main portion front view, partly in cross section showing an operation amount detecting apparatus according to a tenth embodiment of the present invention, and FIG. 14 is a C-C sectional view of FIG. 13 showing a structure of a coupling portion in the operation amount detecting apparatus of the tenth embodiment. Note that members having the same functions as those in the embodiment described above are denoted by the same reference numerals and a duplicate explanation is omitted.

In the operation amount detecting apparatus of the tenth embodiment, as shown in FIG. 13 and FIG. 14, an upper end portion and a lower end portion of an elastic member 21 are coupled with support levers 22, 23, and an intermediate portion of the elastic member 21 is coupled with a coupling lever 26. The support levers 22, 23 are coupled with a brake pedal 11 by support shafts 28, 29, and the coupling lever 26 is coupled with the brake pedal 11 by a coupling shaft 18 so as to relatively move along an axis line direction of the operation rod 15 as well as a relative moving amount of the coupling lever 26 is regulated. The elastic member 21 is attached with four strain sensors 30a, 30b, 31a, 31b between the coupling lever 26 and the support levers 22, 23.

Further, an attachment bolt 27 passes through the elastic member 21 and is threaded to the coupling lever 26, and a disc spring (or a sheet spring) 81 as an elastic deformation assisting member is interposed between the attachment bolt 27 and the elastic member 21 to assist a relative displacement of the coupling lever 26 and the brake pedal 11 caused by an elastic deformation of the elastic member 21. That is, when an operation reaction force acts on the coupling lever 26 from the operation rod 15 via the coupling shaft 18, since an urging force of the disc spring 81 acts on the elastic member 21 in addition to the operation reaction force, the disc spring 81 can assist the elastic deformation of the elastic member 21.

Note that, since an operation of the operation amount detecting apparatus of the tenth embodiment is the same as the first embodiment described above, an explanation of the operation is omitted.

As described above, in the operation amount detecting apparatus of the tenth embodiment, respective end portions of the elastic member 21 are supported to the brake pedal 11 by the support shafts 28, 29 via the support levers 22, 23, the intermediate portion of the elastic member 21 is relatively displaceably coupled the brake pedal 11 by the coupling shaft 18 via the coupling lever 26, and the disc spring 81, which assists the elastic deformation of the elastic member 21, is interposed between the attachment bolt 27 and the elastic member 21. Accordingly, when the operation reaction force acts on the coupling lever 26 from the operation rod 15 via the coupling shaft 18, since the operation reaction force and the urging force of the disc spring 81 act on the elastic member 21, a relative displacement between the coupling lever 26 and the brake pedal 11 due to the elastic deformation of the elastic member 21 can be assisted so that a restriction load is reliably lowered by increasing a relative displacement amount of the coupling lever 26, thereby increasing a detection accuracy by increasing an SN ratio.

Eleventh Embodiment

Figure 15:
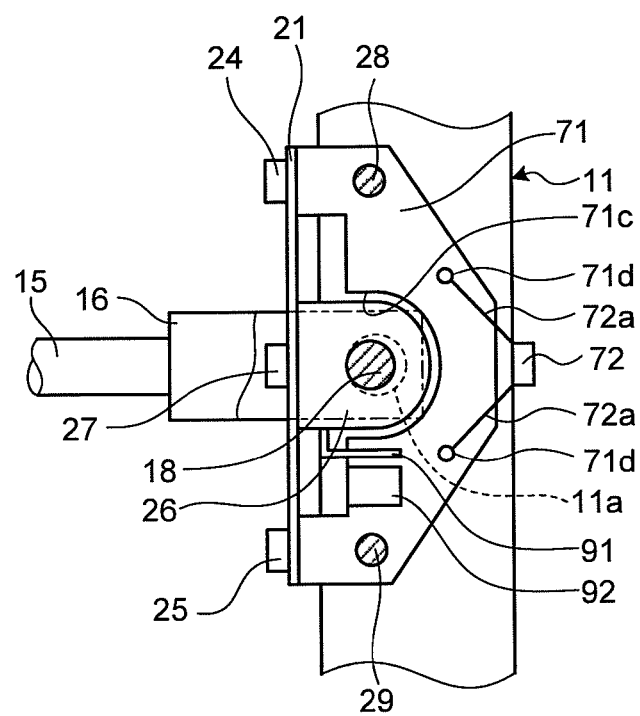
FIG. 15 is a main portion front view, partly in cross section showing an operation amount detecting apparatus according to an eleventh embodiment of the present invention.

FIG. 15 is a main portion front view, partly in cross section showing an operation amount detecting apparatus according to an eleventh embodiment of the present invention. Note that members having the same functions as those in the embodiment described above are denoted by the same reference numerals and a duplicate explanation is omitted.

In the operation amount detecting apparatus of the eleventh embodiment, as shown in FIG. 15, an upper end portion and a lower end portion of an elastic member 21 are coupled with one side and the other side of a support member 71 by attachment bolts 24, 25, and an intermediate portion of the elastic member 21 is coupled with a coupling lever 26. The support member 71 is coupled with a brake pedal 11 by support shafts 28, 29, and the coupling lever 26 is relatively displaceably coupled with the brake pedal 11 by a coupling shaft 18.

The coupling lever 26 is fixed with a detection piece 91, whereas the support member 71 is fixed with a stroke sensor 92 which measures a moving amount of an operation rod 15 in the detection piece 91 in an axis line direction. When the elastic member 21 is elastically deformed by a reaction force load from the operation rod 15, the stroke sensor 92 detects an elastic deformation amount of the elastic member 21 via the coupling lever 26 and outputs the elastic deformation amount as an operation amount of the brake pedal 11.

As described above, in the operation amount detecting apparatus of the eleventh embodiment, respective end portions of the elastic member 21 in a longitudinal direction are coupled with each other by the single support member 71 as well as the support member 71 is supported to the brake pedal 11 by the support shafts 28, 29, the coupling lever 26 is coupled with the intermediate portion of the elastic member 21 and relatively displaceably coupled with the brake pedal 11 by the coupling shaft 18, and the detection piece 91 is fixed to the coupling lever 26, whereas the support member 71 is fixed with the stroke sensor 92 which measures the moving amount of the operation rod 15 in the axis line direction in the detection piece 91. That is, since a detection unit, which detects an elastic deformation amount of the elastic member 21 and outputs the elastic deformation amount as the operation amount, is composed of the stroke sensor 92, a control can be simplified.

Twelfth Embodiment

Figure 16:
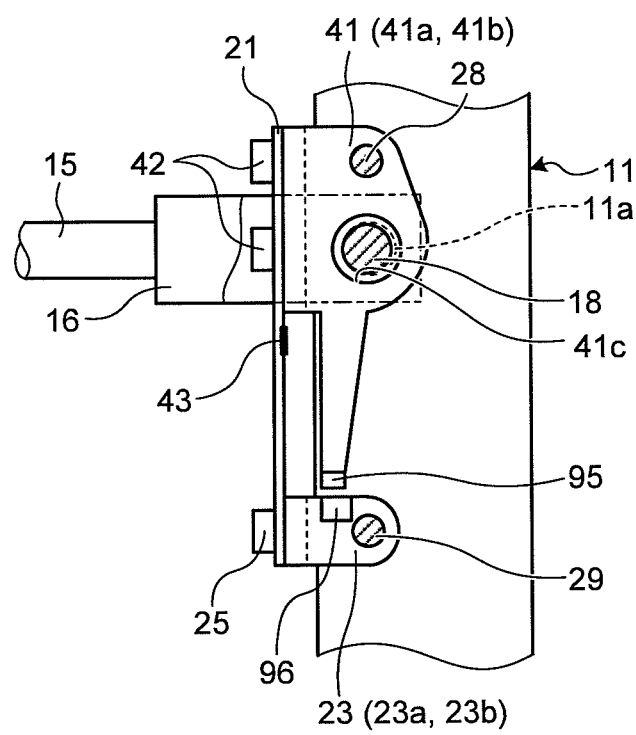
FIG. 16 is a main portion front view, partly in cross section showing an operation amount detecting apparatus according to a twelfth embodiment of the present invention.

FIG. 16 is a main portion front view, partly in cross section showing an operation amount detecting apparatus according to a twelfth embodiment of the present invention. Note that members having the same functions as those in the embodiment described above are denoted by the same reference numerals and a duplicate explanation is omitted.

In the operation amount detecting apparatus of the twelfth embodiment, as shown in FIG. 16, an elastic member 21 is coupled with a support lever 23 by an attachment bolt 25, and an upper end portion of the elastic member 21 is coupled with a support coupling lever 41 by an attachment bolt 42. The support lever 23 is coupled with a brake pedal 11 by a support shaft 29, whereas the support coupling lever 41 is coupled with the brake pedal 11 by a support shaft 28 as well as relatively movably coupled with the brake pedal 11 by a coupling shaft 18.

The support coupling lever 41 is fixed with a detection piece 95, whereas the support lever 23 is fixed with a stroke sensor 96 which measures a moving amount of an operation rod 15 in the detection piece 95 in an axis line direction. When the elastic member 21 is elastically deformed by a reaction force load from the operation rod 15, the stroke sensor 96 detects an elastic deformation amount of the elastic member 21 via the support coupling lever 41 and outputs the elastic deformation amount as an operation amount of the brake pedal 11.

As described above, in the operation amount detecting apparatus of the twelfth embodiment, a lower end portion of the elastic member 21 is coupled with the brake pedal 11 by the support shaft 29 via the support lever 23, whereas an upper end portion of the elastic member 21 is coupled with the brake pedal 11 by the support shaft 28 via the support coupling lever 41 as well as relatively movably coupled with the brake pedal 11 by the coupling shaft 18 via the support coupling lever 41, and the support coupling lever 41 is fixed with the detection piece 95, whereas the support lever 23 is fixed with the stroke sensor 96 which measures the moving amount of the operation rod 15 in the detection piece 95 in the axis line direction. That is, since a detection unit, which detects the elastic deformation amount of the elastic member 21 and outputs the elastic deformation amount as the operation amount, is composed of the stroke sensor 96, a control can be simplified.

INDUSTRIAL APPLICABILITY

As described above, since the operation amount detecting apparatus according to the present invention supports one side of the elastic member, which is elastically deformed by receiving the operation reaction force, at the position which is away in the direction orthogonal to the axis line direction of the operation rod, the operation amount detecting apparatus can reduce the manufacturing cost by simplifying the structure as well as can configure the load restriction function on the other hand, and thus the operation amount detecting apparatus is useful to any operation amount detecting apparatus.

The invention claimed is:

1. An operation amount detecting apparatus that converts a rotational motion of an operation member to a linear motion of an operation rod and detects an operation amount transmitted to an operation target member, comprising:
   a coupling shaft that couples the operation member with the operation rod;
   an elastic member one side of which is supported at a support position of the operation member which is away in a direction orthogonal to an axis line direction of the operation rod with respect to the coupling shaft, the other side of which is coupled with the coupling shaft, both end portions along a longitudinal direction of which are coupled with the support position as the one side, and an intermediate portion between the end portions of which is coupled with the coupling shaft as the other side; and
   a detection unit that detects an elastic deformation amount of the elastic member and outputs the elastic deformation amount as an operation amount,
   wherein the coupling shaft and the support position are positioned on a straight line orthogonal to the axis line direction of the operation rod, and the elastic member extends along the straight line.

2. The operation amount detecting apparatus according to claim 1, wherein the elastic member is fixed with a movable member, and the movable member is coupled with the coupling shaft so as to be relatively movable with respect to the axis line direction of the operation rod.

3. The operation amount detecting apparatus according to claim 2, wherein a relative moving amount of the movable member is regulated by a regulating portion.

4. The operation amount detecting apparatus according to claim 1, wherein the operation member is coupled with the other side of the elastic member so as to be relatively displaceable along an axis direction of the coupling shaft.

5. The operation amount detecting apparatus according to claim 4, wherein the operation member is coupled with the one side of the elastic member so as to be relatively displaceable along an axis direction of a support shaft, and a relative moving amount of the operation member and the one side of the elastic member is set smaller than a relative displacement amount of the operation member and the other side of the elastic member.

6. The operation amount detecting apparatus according to claim 1, wherein the intermediate portion of the elastic member in the longitudinal direction is coupled with the coupling shaft as the other side, and respective end portions of the elastic member in the longitudinal direction are coupled with the operation member as the one side by a support shaft via a support lever.

7. The operation amount detecting apparatus according to claim 6, wherein the elastic member is supported by the support lever so that a reverse direction moment acts on the support shaft on one side and on the support shaft on the other side using a coupling position of the elastic member with the coupling shaft as a base point.

8. The operation amount detecting apparatus according to claim 7, wherein a coupling position of the elastic member and the support lever and a coupling position of the support lever and the support shaft are offset in a direction orthogonal to the axis line direction of the operation rod.

9. The operation amount detecting apparatus according to claim 6, wherein the support lever on one side and the movable member are integrally formed, and the coupling shaft is offset to the support shaft side of the support lever on the one side.

10. The operation amount detecting apparatus according to claim 9, wherein a coupling position of the elastic member and the support lever on the other side and a coupling position of the support lever on the other side and the support shaft are offset in a direction orthogonal to the axis line direction of the operation rod.

11. The operation amount detecting apparatus according to claim 6, wherein support levers of respective end portions of the elastic member in the longitudinal direction are integrally coupled with each other by a coupling member.

12. The operation amount detecting apparatus according to claim 11, wherein the coupling member is disposed with a regulating portion that regulates a relative moving amount of the movable member.

13. The operation amount detecting apparatus according to claim 2, wherein a position at which a load is input to the elastic member and a position at which a load is input from the elastic member to the movable member are offset in a direction orthogonal to the axis line direction of the operation rod.

14. The operation amount detecting apparatus according to claim 1, wherein an urging member is disposed to urge the operation member and the elastic member in a direction where the operation member approaches the elastic member.

15. The operation amount detecting apparatus according to claim 1, wherein an elastic deformation assisting member is disposed to assist an elastic deformation of the elastic member.

16. The operation amount detecting apparatus according to claim 1, wherein a strain sensor as the detection unit is disposed between the coupling shaft and the support position in the elastic member.

17. An operation amount detecting apparatus that converts a rotational motion of an operation member to a linear motion of an operation rod and detects an operation amount transmitted to an operation target member, wherein:

the operation member is coupled with the operation rod by a coupling shaft;

one side of an elastic member is supported to the operation member by a support shaft, the operation member is away in a direction orthogonal to an axis line direction of the operation rod with respect to the coupling shaft;

a movable member is fixed to the other side of the elastic member and coupled with the coupling shaft relatively movable with respect to the axis line direction of the operation rod;

the elastic member having both end portions along a longitudinal direction of the elastic member coupled with the support position as the one side, and an intermediate portion between the end portions coupled with the coupling portion as the other side; and the elastic member is attached with a detection unit that detects an elastic deformation amount and outputs the elastic deformation amount as an operation amount, wherein the coupling shaft and the support position are positioned on a straight line orthogonal to the axis line direction of the operation rod, and the elastic member extends along the straight line.

18. The operation amount detecting apparatus according to claim 2, wherein the operation member is coupled with the other side of the elastic member so as to be relatively displaceable along an axis direction of the coupling shaft.

19. The operation amount detecting apparatus according to claim 3, wherein the operation member is coupled with the other side of the elastic member so as to be relatively displaceable along an axis direction of the coupling shaft.

20. The operation amount detecting apparatus according to claim 2, wherein the intermediate portion of the elastic member in the longitudinal direction is coupled with the coupling shaft as the other side, and respective end portions of the elastic member in the longitudinal direction are coupled with the operation member as the one side by a support shaft via a support lever.

\* \* \* \* \*